United States Patent
Chen et al.

(10) Patent No.: US 9,535,946 B2
(45) Date of Patent: *Jan. 3, 2017

(54) SYSTEM METHOD, AND COMPUTER READABLE MEDIA FOR IDENTIFYING A USER-INITIATED LOG FILE RECORD IN A LOG FILE

(71) Applicant: International Business Machines Corporation, Armonk, NY (US)

(72) Inventors: Danny Yen-Fu Chen, Austin, TX (US); David A. Cox, Sugar Grove, IL (US); Sheryl S. Kinstler, Dripping Springs, TX (US); Fabian F. Morgan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,787

(22) Filed: Jun. 3, 2015

(65) Prior Publication Data

US 2015/0269222 A1 Sep. 24, 2015

Related U.S. Application Data

(63) Continuation of application No. 14/226,405, filed on Mar. 26, 2014, now Pat. No. 9,075,817, which is a
(Continued)

(51) Int. Cl.
*G06F 17/30* (2006.01)
*G06F 11/34* (2006.01)

(52) U.S. Cl.
CPC ..... *G06F 17/30424* (2013.01); *G06F 11/3476* (2013.01); *G06F 17/30117* (2013.01); *G06F 17/30156* (2013.01)

(58) Field of Classification Search
CPC .................. G06F 17/30867; G06F 17/30424
See application file for complete search history.

(56) References Cited

U.S. PATENT DOCUMENTS 5,530,848 A 6/1996 Gilbert et al.
5,847,972 A 12/1998 Eick et al.
(Continued)

OTHER PUBLICATIONS

Notice of Allowance dated Aug. 22, 2011 for U.S. Appl. No. 12/124,235.
(Continued)

*Primary Examiner* — Mohammad S Rostami
(74) *Attorney, Agent, or Firm* — Isaac Gooshaw, Esq.; George S. Blasiak, Esq.; Heslin Rothenberg Farley & Mesiti P.C.

(57) ABSTRACT

A system, a method, and a computer readable media for identifying a user-initiated log file record in a log file are provided. The log file has a user-initiated log file record and a repeating pattern of log file records automatically generated by a software program. The system allows a user to identify first and second timestamp values corresponding to first and second times which identify a time interval of interest in the log file. The system further analyzes the log file to identify the user-initiated log file record having a timestamp value between the first and second timestamp values. The system further identifies the repeating pattern of log file records in the log file.

19 Claims, 7 Drawing Sheets

Related U.S. Application Data continuation of application No. 13/456,511, filed on Apr. 26, 2012, now Pat. No. 8,732,199, which is a continuation of application No. 12/109,516, filed on Apr. 25, 2008, now Pat. No. 8,219,582.

(56) References Cited

U.S. PATENT DOCUMENTS

| | | | |
|---|---|---|---|
| 6,816,576 B2 | 11/2004 | Kasvand et al. | |
| 6,847,983 B2 | 1/2005 | Somalwar et al. | |
| 6,996,843 B1 | 2/2006 | Moran | |
| 7,139,744 B2 | 11/2006 | Tran et al. | |
| 7,206,835 B2 | 4/2007 | Kusumoto et al. | |
| 7,216,336 B1 | 5/2007 | Ezra et al. | |
| 7,340,037 B1 | 3/2008 | Jean et al. | |
| 7,415,591 B1 | 8/2008 | Todd et al. | |
| 7,483,810 B2 | 1/2009 | Jackson et al. | |
| 7,506,195 B2 | 3/2009 | Takahashi et al. | |
| 7,617,262 B2 * | 11/2009 | Prahlad | G06F 17/30212 |
| 7,676,760 B1 | 3/2010 | Rosenquist et al. | |
| 7,797,585 B1 | 9/2010 | Sahin et al. | |
| 8,090,994 B2 | 1/2012 | Chen et al. | |
| 2001/0016849 A1 | 8/2001 | Squibbs | |
| 2002/0042821 A1 | 4/2002 | Muret et al. | |
| 2002/0174083 A1 * | 11/2002 | Hellerstein | G06F 17/30551 706/48 |
| 2003/0084098 A1 | 5/2003 | Lavin et al. | |
| 2003/0120710 A1 | 6/2003 | Pulsipher et al. | |
| 2003/0126114 A1 | 7/2003 | Tedesco | |
| 2003/0236766 A1 | 12/2003 | Fortuna et al. | |
| 2005/0120060 A1 | 6/2005 | Meng | |
| 2005/0138483 A1 * | 6/2005 | Hatonen | G06F 11/3466 714/45 |
| 2005/0193036 A1 * | 9/2005 | Phillips | G06F 11/0742 |
| 2005/0278324 A1 | 12/2005 | Fan et al. | |
| 2006/0074847 A1 | 4/2006 | Yatabe et al. | |
| 2006/0149748 A1 | 7/2006 | Yamakawa et al. | |
| 2006/0184529 A1 | 8/2006 | Berg et al. | |
| 2006/0271784 A1 * | 11/2006 | Bolosky | G06Q 10/107 713/170 |
| 2007/0112864 A1 | 5/2007 | Ben-Natan | |
| 2007/0112953 A1 | 5/2007 | Barnett | |
| 2007/0157315 A1 | 7/2007 | Moran | |
| 2007/0209075 A1 | 9/2007 | Coffman | |
| 2007/0258106 A1 | 11/2007 | Ishiyama et al. | |
| 2007/0260932 A1 | 11/2007 | Prichard et al. | |
| 2007/0271276 A1 | 11/2007 | Allen et al. | |
| 2007/0294271 A1 | 12/2007 | Bammi et al. | |
| 2008/0155564 A1 | 6/2008 | Shcherbina et al. | |
| 2008/0313345 A1 * | 12/2008 | Bernardin | G06F 9/505 709/235 |
| 2009/0089233 A1 | 4/2009 | Gach et al. | |
| 2009/0271448 A1 | 10/2009 | Chen et al. | |
| 2009/0292742 A1 | 11/2009 | Chen et al. | |

OTHER PUBLICATIONS

Notice of Allowance dated Jul. 5, 2011 for U.S. Appl. No. 12/124,235.
Final Office Action dated Mar. 11, 2011 for U.S. Appl. No. 12/124,235.
Non-Final Office Action dated Sep. 28, 2010 for U.S. Appl. No. 12/124,235.
Notice of Allowance dated Mar. 6, 2012 for U.S. Appl. No. 12/109,516.
Non-Final Office Action dated Sep. 7, 2011 for U.S. Appl. No. 12/109,516.
Final Office Action dated Apr. 15, 2011 for U.S. Appl. No. 12/109,516.
Non-Final Office Action dated Sep. 30, 2010 for U.S. Appl. No. 12/109,516.
Notice of Allowance dated Mar. 3, 2015 for U.S. Appl. No. 14/226,405.

* cited by examiner

```
[11/18/07 19:32:49:568 CST] 0000002f SystemOut    O 18 Nov 2007 19:32:49:568
[INFO] USER = (MAXADMIN) SPID = C0A89F80.G780.071118210551) app (null)
object (ESCREFPOINT) :select * from escrefpoint where escalation = '1019'
```

```
[11/18/07 19:32:49:608 CST] 0000002f SystemOut    O 18 Nov 2007 19:32:49:608
[INFO] USER = (MAXADMIN) : select action from action where actionid = 24
```

```
[11/18/07 19:32:49:702 CST] 0000002f SystemOut O    18 Nov 2007 19:32:49:702
[INFO] USER = (MAXADMIN) SPID = (C0A89F80.G780.071118210551) app (null)
object (INCIDENT) :select *from incident where (orgid= 'EAGLENA' ) and
historyflag=0 and ticketuid in (select ownerid from slarecords where
ownertable= 'TICKET' and slanum= '1012' ) and actualstart is null and
targetstart <= { ts '2007-11-18 19:37:49' } and not exists (select ownerid
from escrepeattrack where ownerid = ticketuid and objectname= 'INCIDENT' and
refpointid=42 and escalation= '1019' )
```

```
[11/18/07 19:32:49:758 CST] 0000002f SystemOut    O 18 Nov 2007 19:32:49:758
[INFO] USER = (MAXADMIN) : insert into actiongroup (action, member) values
('INVSTATUSGRP', 'INVSTATUSCHG')
```

```
[11/18/07 19:32:49:800 CST] 0000002f SystemOut    O 18 Nov 2007 19:32:49:800
[INFO] USER = (MAXADMIN) : insert into actionscfg (actionid, optionname, app)
values (24, 'INSERT', 'CHANGE')
```

```
[11/18/07 19:32:49:836 CST] 0000002f SystemOut    O 18 Nov 2007 19:32:49:836
[INFO] USER = (MAXADMIN) SPID = (C0A89F80.G780.071118210551) app (null)
object (INCIDENT) :select * from incident where (orgid= 'EAGLENA' ) and
historyflag=0 and ticketuid in (select ownerid from slarecords where
ownertable= 'TICKET' and slanum= '1012' ) and actualstart is null and
targetstart <= { ts '2007-11-18 19:32:49' } and not exists (select ownerid
from escrepeattrack where ownerid = ticketuid and objectname= 'INCIDENT' and
refpointid=43 and escalation= '1019' )
```

72
[11/18/07 19:32:49:608 CST] 0000002f SystemOut    O 18 Nov 2007 19:32:49:608
[INFO] USER = (MAXADMIN) : select action from action where actionid = 24

76
[11/18/07 19:32:49:758 CST] 0000002f SystemOut    O 18 Nov 2007 19:32:49:758
[INFO] USER = (MAXADMIN) : insert into actiongroup (action, member) values
('INVSTATUSGRP', 'INVSTATUSCHG')

78
[11/18/07 19:32:49:800 CST] 0000002f SystemOut    O 18 Nov 2007 19:32:49:800
[INFO] USER = (MAXADMIN) : insert into actionscfg (actionid, optionname, app)
values (24, 'INSERT', 'CHANGE')

FIG. 6

SYSTEM METHOD, AND COMPUTER READABLE MEDIA FOR IDENTIFYING A USER-INITIATED LOG FILE RECORD IN A LOG FILE

CROSS REFERENCE TO RELATED APPLICATION

This application is a continuation application of U.S. patent application Ser. No. 14/226,405 filed on Mar. 26, 2014, which is a continuation of U.S. patent application Ser. No. 13/456,511 filed on Apr. 26, 2012, now U.S. Pat. No. 8,732,199 issued on May 20, 2014, which is a continuation of U.S. patent application Ser. No. 12/109,516 filed on Apr. 25, 2008, now U.S. Pat. No. 8,219,582 issued on Jul. 10, 2012.

FIELD OF INVENTION

This application relates to a system, a method, and a computer readable media for identifying a user-initiated log file record in a log file.

BACKGROUND OF INVENTION

When developing or working with various software applications, it is often necessary to make use of log files which indicate commands or tasks that are being executed within a software application. For example, a user may desire to capture the commands needed to perform an action in a software application. In this case, the user could instruct the software application to perform a task and then could view a log file to view log file records to determine the commands that were generated to perform the task.

One drawback with the foregoing approach is that some software applications perform tasks known as cron task commands that can be repeated at scheduled intervals, which can introduce log file records having commands to perform the tasks in a log file. Thus, it may be difficult to determine which log file records in a log file have commands corresponding to the cron task commands. The drawback is exacerbated as a number of active running cron task commands is increased.

Accordingly, the inventors herein have recognized a need for a system, a method, and a computer readable media for identifying a user-initiated log file record that minimizes and/or eliminates the above-identified drawback.

SUMMARY OF INVENTION

A method for identifying a user-initiated log file record in a log file in accordance with an exemplary embodiment is provided. The method includes selecting the log file having a plurality of log file records therein. The plurality of log file records have at least in part a repeating pattern of log file records automatically generated by a software program. The method further includes executing a first software command to store a first timestamp value in a memory device. The first timestamp value indicates a first time. The method further includes executing at least a first user-initiated software command that induces a computer to store at least a first log file record having a second time stamp value in the log file. The second timestamp value indicates a second time after the first time. The method further includes executing a second software command to store a third timestamp value in the memory device. The third timestamp value indicates a third time. The third time is after the second time and after execution of the first user-initiated software command is completed. The method further includes analyzing the plurality of log file records in the log file to identify the repeating pattern of log file records stored therein. The method further includes extracting the repeating pattern of log file records from the plurality of commands to identify the first log file record having the second timestamp value that was generated between the first and third times. The method further includes storing the first log file record associated with the first user-initiated software command in the memory device.

A system for identifying a user-initiated log file record in a log file in accordance with another exemplary embodiment is provided. The system includes a memory device having the log file stored therein. The system further includes a computer operably communicating with the memory device. The computer is configured to display first and second graphical user interfaces on a display device. The first graphical user interface is configured to allow a user to select the log file. The log file has a plurality of log file records therein. The plurality of log file records have at least in part a repeating pattern of log file records. The first graphical user interface is further configured to allow the user to execute a first software command to store a first timestamp value in the memory device. The first timestamp value indicates a first time. The second graphical user interface is configured to allow the user to execute at least a first user-initiated software command that induces the computer to store at least a first log file record having a second time stamp value in the log file. The second timestamp value indicates a second time after the first time. The first graphical user interface is further configured to allow the user to execute a second software command to store a third timestamp value in the memory device. The third timestamp value indicates a third time. The third time is after the second time and after execution of the first user-initiated software command is completed. The computer is further configured to analyze the plurality of log file records in the log file to identify the repeating pattern of log file records stored therein. The computer is further configured to extract the repeating pattern of log file records from the plurality of commands to identify the first log file record having the second timestamp value that was generated between the first and third times. The computer is further configured to store the first log file record associated with the first user-initiated software command in the memory device.

One or more computer readable media having computer-executable instructions implementing a method for identifying a user-initiated log file record in a log file in accordance with another exemplary embodiment is provided. The method includes selecting the log file having a plurality of log file records therein, the plurality of log file records having at least in part a repeating pattern of log file records automatically generated by a software program. The method further includes executing a first software command to store a first timestamp value in a memory device. The first timestamp value indicates a first time. The method further includes executing at least a first user-initiated software command that induces a computer to store at least a first log file record having a second time stamp value in the log file. The second timestamp value indicates a second time after the first time. The method further includes executing a second software command to store a third timestamp value in the memory device. The third timestamp value indicates a third time. The third time is after the second time and after execution of the first user-initiated software command is completed. The method further includes analyzing the plurality of log file records in the log file to identify the repeating pattern of log file records stored therein. The method further includes extracting the repeating pattern of log file records from the plurality of commands to identify the first log file record having the second timestamp value that was generated between the first and third times. The method further includes storing the first log file record associated with the first user-initiated software command in the memory device.

BRIEF DESCRIPTION OF DRAWINGS

FIG. 3 is a schematic of exemplary log file records displayed in the first graphical user interface of FIG. 2;

FIG. 6 is a schematic of exemplary log file records displayed in the graphical user interface of FIG. 5.

DESCRIPTION OF EXEMPLARY EMBODIMENTS

Figure 1:
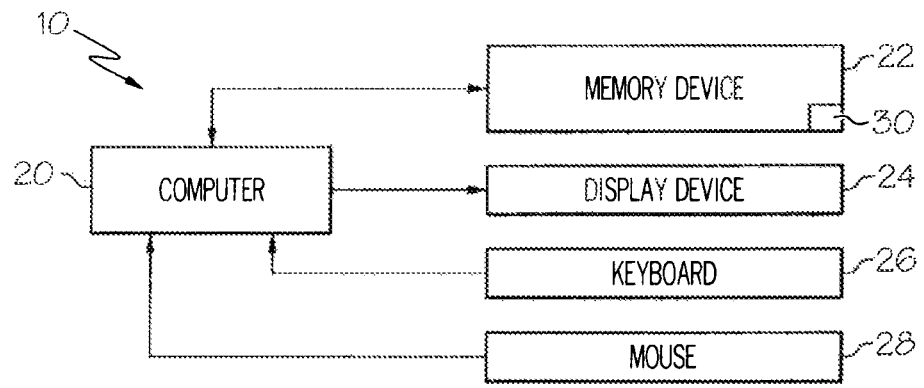
FIG. 1 is a schematic of a system for identifying user-initiated log file records in a log file in accordance with an exemplary embodiment.

Referring to FIG. 1, a system 10 for identifying a user-initiated log file record in a log file is illustrated. The system 10 includes a computer 20, a memory device 22, a display device 24, a keyboard 26, and a mouse 28. An advantage of the system 10 is that the system 10 can identify at least one user-initiated log file record in a log file that also has a repeating pattern of log file records automatically generated by a software program.

The computer 20 is configured to execute software routines for identifying at least one user-initiated log file record in a log file 30. The computer 20 is operably coupled to the memory device 22, the display device 24, the keyboard 26, and the mouse 28.

The memory device 22 is configured to store data generated by the computer 20. In particular, the memory device 22 is configured to store the log file 30 generated by the computer 20.

The keyboard 26 is configured to allow a user to input data on graphical user interfaces displayed on the display device 24. The keyboard 26 is operably coupled to the computer 20.

The mouse 28 is configured to allow a user to select items on graphical user interfaces displayed on the display device 24. The mouse 28 is operably coupled to the computer 20.

The computer 20 is further configured to induce the display device 24 to display graphical user interfaces thereon which will be utilized by the computer 20 for identifying a user-initiated log file record in the log file 30.

Figure 2:
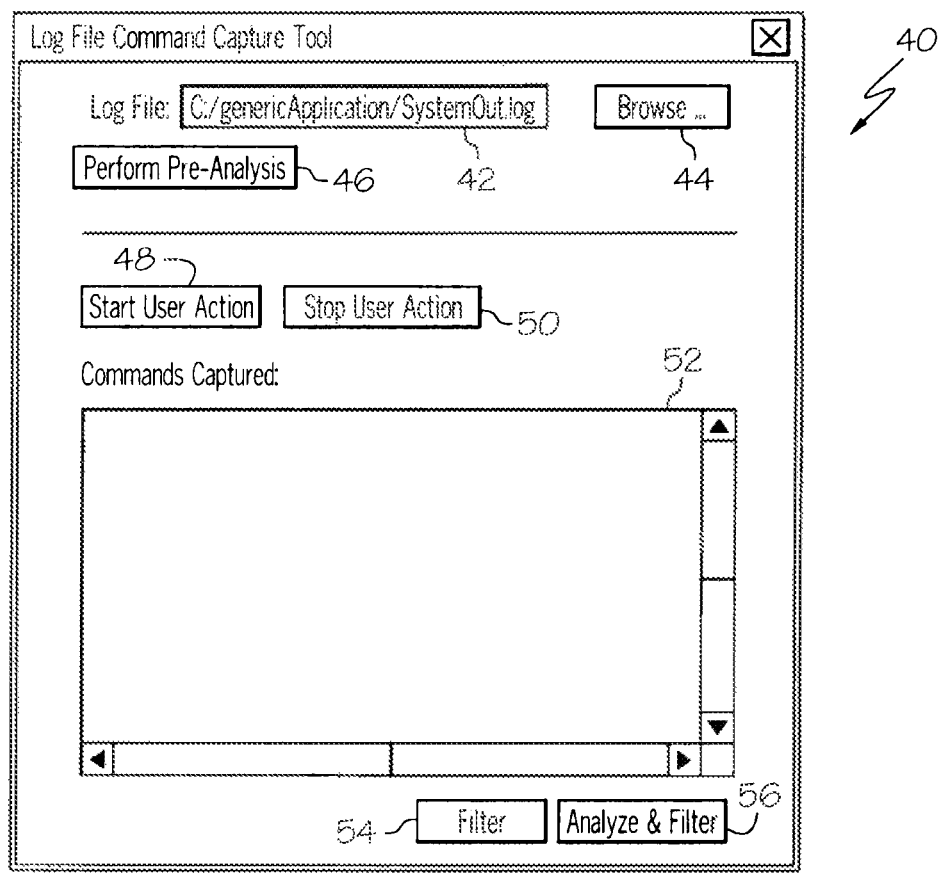
FIG. 2 is a schematic of a graphical user interface generated by the system of FIG. 1.

Referring to FIG. 2, a graphical user interface 40 that is configured to display log file records in a log file 30 will now be explained. The graphical user interface 40 includes a text box 42, a browse command button 44, a perform pre-analysis command button 46, a start user action command button 48, a stop user action command button 50, a text frame 52, a filter command button 54, and an analyze-and-filter command button 56.

The log file text box 42 is configured to allow a user to input a directory path and file name of the log file 30 therein, utilizing the keyboard 26, such that the computer 20 can access the log file 30 in the memory device 22.

The browse command button 44 is configured to allow user to view directories and file names stored in the memory device 22 such that the user can select the log file 30, utilizing the mouse 28.

The perform pre-analysis command button 46 is configured to allow a user to instruct the computer 20 to analyze the log file 30 specified in the log file text box 42, to determine a repeating pattern of log file records automatically generated by a software program and stored in the log file 30. In particular, when the user selects the pre-analysis command button 46, the computer 20 analyzes each record in the log file 30 to determine substantially similar log file records that are duplicated in the log file 30 at predetermined time intervals. The substantially similar log file records that are duplicated in the log file 30 at predetermined time intervals are identified and flagged by the computer 20. It should be noted that the log file records in the log file 30 that are not part of a repeating pattern of log file records are user-initiated log file records.

The start user action command button 48 is configured to allow a user to instruct the computer 20 when a user action or command in the graphical user interface 100 (that will cause log file records to be stored in the log file 30), will subsequently be executed. In particular, when the user selects the start user action command button 48 utilizing the mouse 28, the computer 20 will either: (i) store a first timestamp value in the memory device 22 indicating when the user selected the button 48, or (ii) store an identifying marker in the log file 30 indicating when the user selected the button 48.

The stop user action command button 50 is configured to allow a user to instruct the computer 20 when a user action or command in the graphical user interface 100 (that will cause log file records to be stored in the log file 30), is not being executed or has ended. In particular, when the user selects the stop user action command button 50 utilizing the mouse 28, the computer 20 will either: (i) store a second timestamp value in the memory device 22 indicating when the user selected the button 50, or (ii) store an identifying marker in the log file 30 indicating when the user selected the button 50.

The text frame 52 is configured to display log file records in the log file 30 that were output to the log file 30 between the pressing of the start user action command button 48 and the stop user action command button 50. In particular, when a user selects the log file 30 utilizing the log file text box 42, the computer 20 displays the associated log file records in the text frame 52. Referring to FIG. 3, exemplary records in the log file 30 will now be discussed. As shown, the exemplary log file 30 includes exemplary records 70, 72, 74, 76, 78 and 80. Of course, in an alternative embodiment, the log file 30 could have one or more records with a different format from that shown in FIG. 3. In one exemplary embodiment, the computer 20 stores the marker 71 in the file 30 when the user selected the start user action command button 48. In the exemplary embodiment, the computer 20 stores the marker 81 in the log file 30 when the user selected the stop user action command button 50. Accordingly, marker 71, 81 delineate a time interval in which a user is interested in identifying user initiated log file records in the log file 30.

Accordingly, one or more of the log file records between the marker 71 and the marker 81 correspond to a user initiated log file record. In this example, the log file records 74, 80 are a repeating pattern of log file records that are automatically generated by a software program. Accordingly, the remaining log file records 72, 76 and 78 correspond to user-initiated log file records in the log file 30 that were generated by user commands in the graphical user interface 100.

Figure 5:
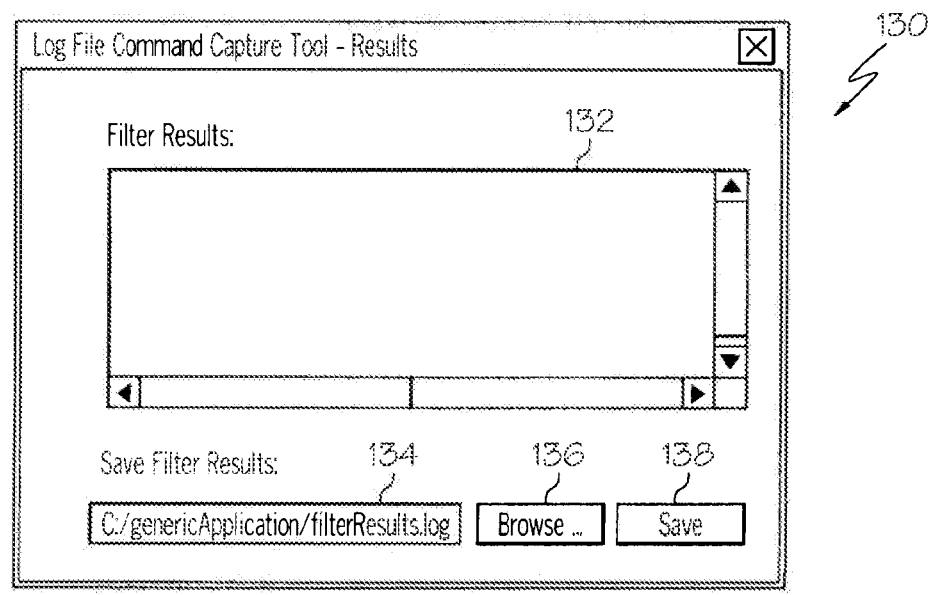
FIG. 5 is a schematic of another graphical user interface generated by the system of FIG. 1.

Referring to FIGS. 2 and 5, the filter command button 54 is configured to allow a user to instruct the computer 20 to display the graphical user interface 130 on the display device 24, for displaying the user-initiated log file records. The graphical user interface 130 will be explained in greater detail below.

The analyze-and-filter command button 56 is configured to instruct the computer 20 to analyze the log file 30 specified in the log file text box 52 to: (i) determine a repeating pattern of log file records automatically generated by a software program and stored in the log file 30, and (ii) to display only the user-initiated log file records in the log file 30 in the graphical user interface 130. In particular, when the user selects the analyze-and-filter command button 56, the computer 20 analyzes each record in the log file 30 to determine substantially similar log file records that are duplicated in the log file 30 at predetermined time intervals. The computer 20 also identifies the user-initiated log file records which are not part of a repeating pattern of log file records and induces the graphical user interface 130 to display the user-initiated log file records therein.

Referring to FIGS. 5 and 6, the graphical user interface 130 will now be explained in greater detail. The graphical user interface 130 includes a text frame 132, a filter file text box 134, a browse command button 136, and a save command button 138. The text frame 132 is configured to display user-initiated log file records in the log file 30 therein. In one exemplary embodiment, the user-initiated log file records 72, 76 and 78 are displayed in the text frame 132. The filter file text box 134 is configured to allow a user to input a directory path and a file name, utilizing the keyboard 26, for a file that will be stored in the memory device 22 having only the user-initiated log file records. The browse command button 136 is configured to allow user to select a directory and a file name for a file that the computer 20 will store the user-initiated log file records therein. The browse command button 136 is selected via the mouse 28. The save command 138 is configured to allow a user to save the file specified in the filter file text box 134.

Figure 4:
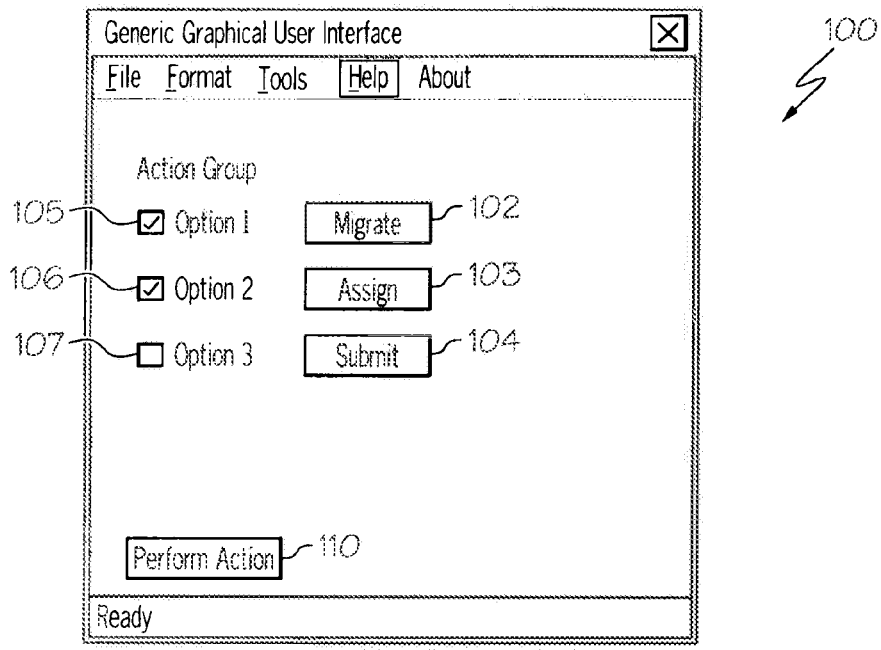
FIG. 4 is a schematic of another graphical user interface generated by the system of FIG. 1.

Referring to FIG. 4, the graphical user interface 100 is configured to allow a user to select at least one user-initiated command that will be executed by the computer 20 and will induce the computer 20 to generate a corresponding user-initiated log file record that is stored in the log file 30. The graphical user interface 100 includes a migrate command button 102, an assign command button 103, a submit command button 104, option selection boxes 105, 106, 107, and a perform action button 110.

When a user selects the migrate command button 102 utilizing the mouse 28, the graphical user interface 100 displays a check mark in the option selection box 105. Further, when the user selects the perform action button 110, the computer 20 executes at least one migrate software command for performing a migrate task and generates a user-initiated log file record corresponding to the migrate software command that is stored in the log file 30.

When the user selects the assign command button 103 utilizing the mouse 28, the graphical user interface 100 displays a check mark in the option selection box 106. Further, when the user subsequently selects the perform action button 110 the computer 20 executes at least one assign software command for performing an assign task and generates a user-initiated log file record corresponding to the assign software command that is stored in the log file 30.

When the user selects the submit command button 104 utilizing the mouse 28, the graphical user interface 100 displays a check mark in the option selection box 107. Further, when the user subsequently selects the perform action button 110 the computer 20 executes at least one submit software command for performing a submit task and generates a user-initiated log file record corresponding to the submit software command that is stored in the log file 30.

Figure 7:
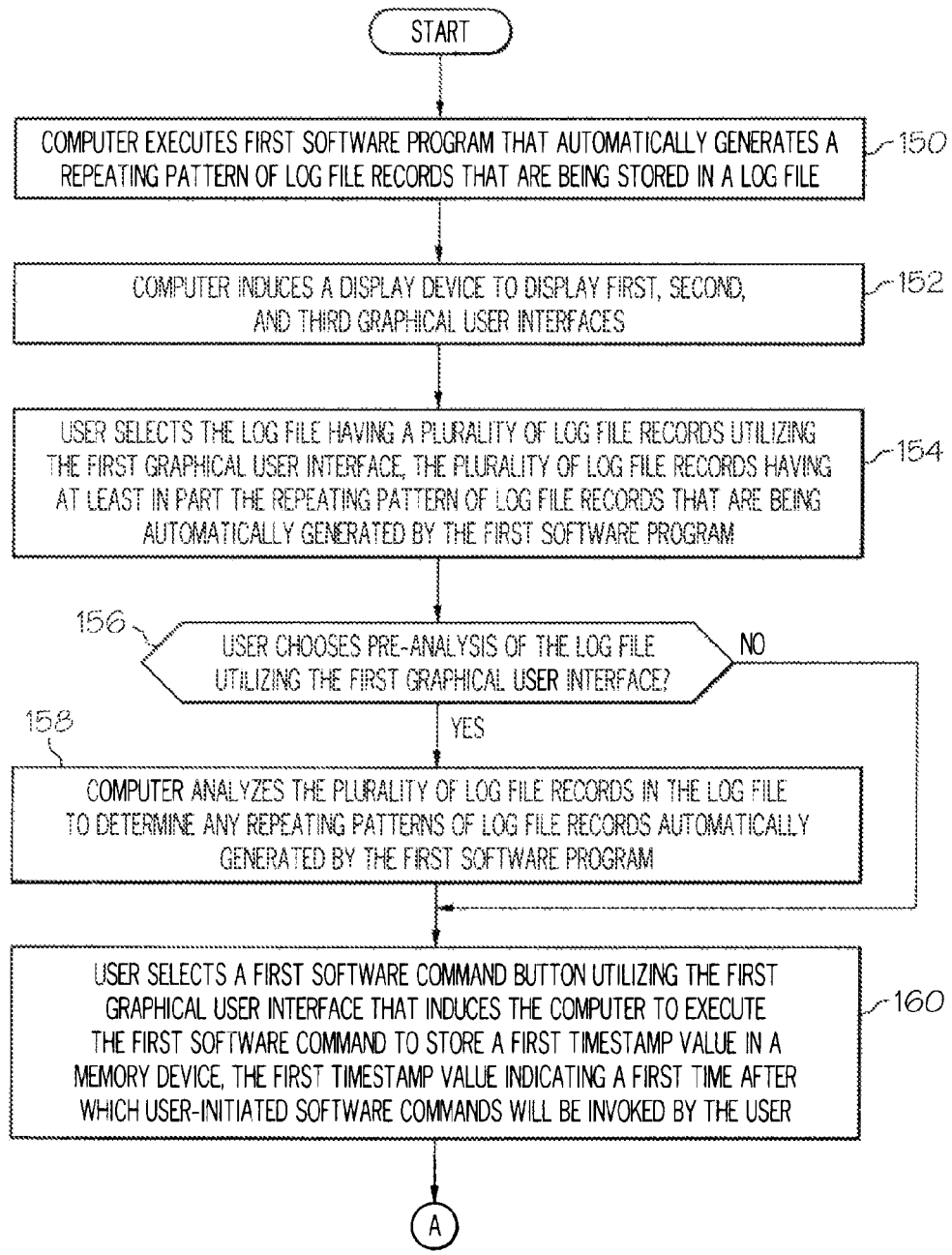
FIGS. 7-9 are flowcharts of a method for identifying a user-initiated log file record in a log file in accordance with another exemplary embodiment.
Figure 8:
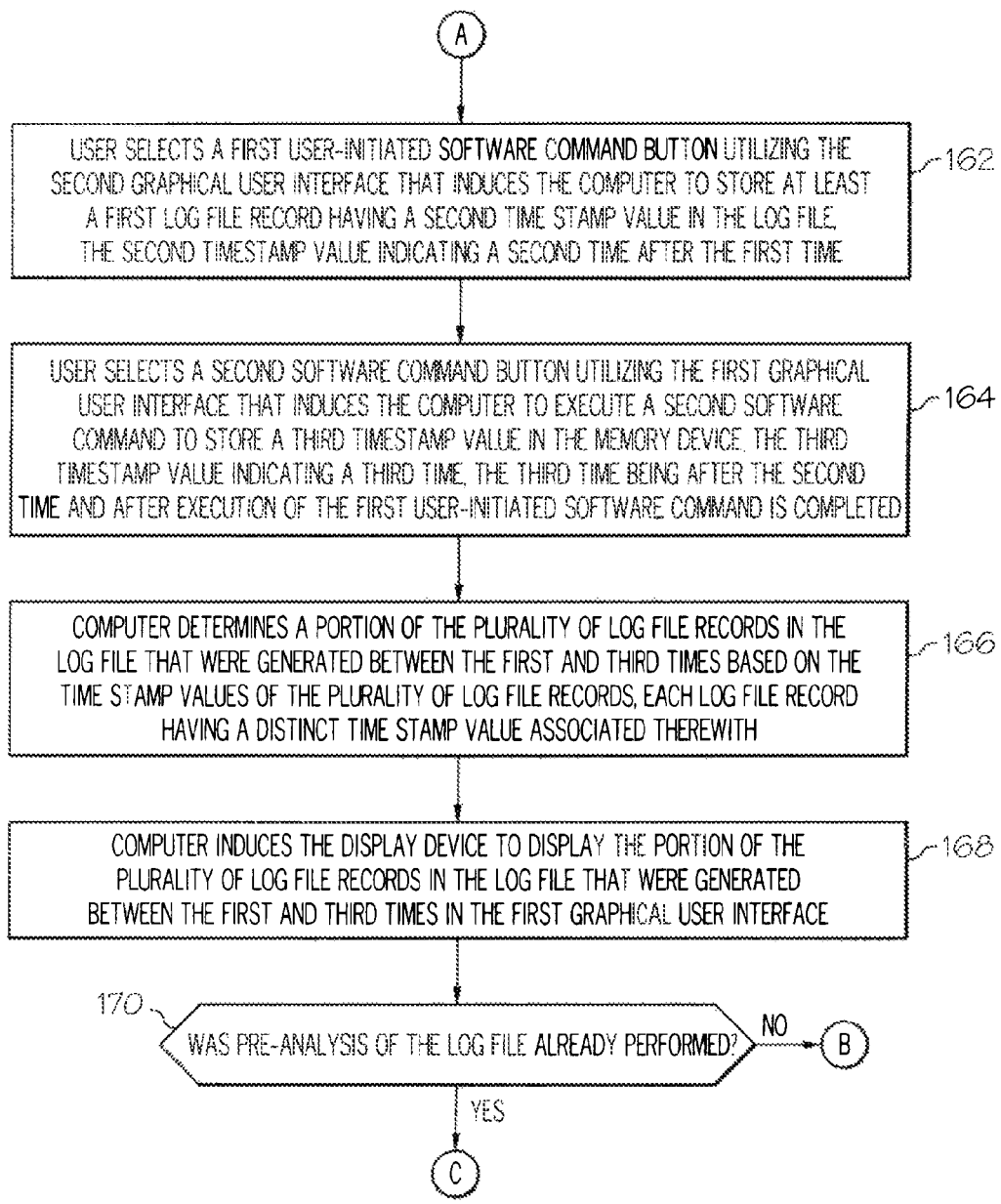
Figure 9:
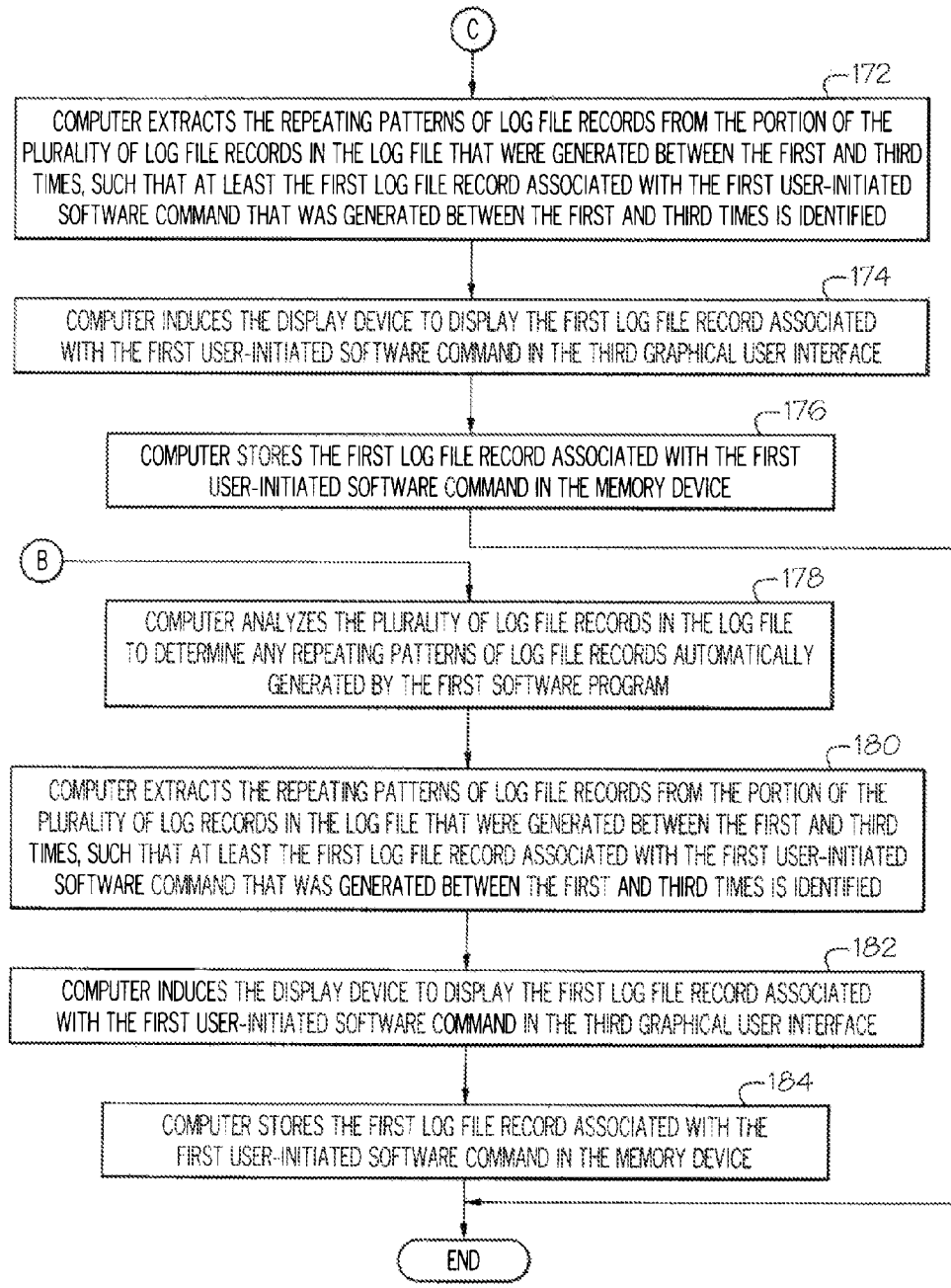

Referring to FIGS. 7-9, a flowchart of a method for identifying a user-initiated log file record in a log file will now be explained. It should be noted that although only one user-initiated log file record is identified in the method for purposes of simplicity, the method could be utilized to identify a plurality of user-initiated log file records in a log file.

At step 150, the computer 20 executes first software program that automatically generates a repeating pattern of log file records that are being stored in the log file 30. After step 150, the method advances to step 152.

At step 152, the computer 20 induces the display device 24 to display graphical user interfaces 40, 100 and 130. After step 152, the method advances to step 154.

At step 154, the user selects the log file 30 having a plurality of log file records utilizing the graphical user interface 40. The plurality of log file records have at least in part the repeating pattern of log file records that are being automatically generated by the first software program. After step 154, the method advances to step 156.

At step 156, the computer 20 makes a determination as to whether a user has chosen to perform pre-analysis of the log file 30 utilizing the graphical user interface 40. In particular, the computer 20 determines whether the user has selected the perform pre-analysis command button 56. If the value of step 156 equals "yes", the method advances to step 158. Otherwise, the method advances to step 160.

At step 158, the computer 20 analyzes the plurality of log file records in the log file 30 to determine any repeating patterns of log file records automatically generated by the first software program. After step 158, the method advances to step 160.

At step 160, the user selects the start user action command button 48 utilizing the graphical user interface 40 that induces the computer 20 to execute a first software command to store a first timestamp value in a memory device 22. The first timestamp value indicates a first time after which user-initiated software commands will be invoked by the user. After step 160, the method advances to step 162.

At step 162, the user selects a first user-initiated software command button utilizing the graphical user interface 100 that induces the computer 20 to store at least a first log file record having a second time stamp value in the log file 30. The second timestamp value indicates a second time after the first time. After step 162, the method advances to step 164.

At step 164, the user selects a stop user action command button 50 utilizing the graphical user interface 40 that induces the computer 20 to execute a second software command to store a third timestamp value in the memory device 22. The third timestamp value indicates a third time. The third time is after the second time and after execution of the first user-initiated software command is completed. After step 164, the method advances to step 166.

At step 166, computer 20 determines a portion of the plurality of log file records in the log file 30 that were generated between the first and third times based on the time stamp values of the plurality of log file records. Each log file record has a distinct time stamp value associated therewith. After step 166, the method advances to step 168.

At step 168, the computer 20 induces the display device 24 to display the portion of the plurality of log file records in the log file 30 that were generated between the first and third times in the text box 52 of the graphical user interface 40. After step 168, the method advances to step 170.

At step 170, the computer 20 makes a determination as to whether pre-analysis of the log file was already performed. In particular, the computer 20 makes the determination as to whether pre-analysis of the log file 30 was already performed, when the user selects either the filter command button 54 or the analyze-and-filter command button 56. If the value of step 170 equals "yes", the method advances to step 172. Otherwise, the method advances to step 178.

At step 172, computer 20 extracts the repeating patterns of log file records from the portion of the plurality of log file records in the log file 30 that were generated between the first and third times, such that at least the first log file record associated with the first user-initiated software command that was generated between the first and third times is identified. After step 172, the method advances to step 174.

At step 174, the computer 20 induces the display device 24 to display the first log file record associated with the first user-initiated software command in the graphical user interface 130. After step 174, the method advances to step 176.

At step 176, the computer 20 stores the first log file record associated with the first user-initiated software command in the memory device 22. After step 176, the method is exited.

Referring again to step 170, when the value of step 170 equals "no", the method advances to step 178. At step 178, the computer 20 analyzes the plurality of log file records in the log file 30 to determine any repeating patterns of log file records automatically generated by the first software program. After step 178, the method advances to step 180.

At step 180, the computer 20 extracts the repeating patterns of log file records from the portion of the plurality of log file records in the log file 30 that were generated between the first and third times, such that at least the first log file record associated with the first user-initiated software command that was generated between the first and third times is identified. After step 180, the method advances to step 182.

At step 182, the computer 20 induces the display device 24 to display the first log file record associated with the first user-initiated software command in the graphical user interface 130. After step 182, the method advances to step 184.

At step 184, the computer 20 stores the first log file record associated with the first user-initiated software command in the memory device 22. After step 184, the method is exited.

An exemplary method for determining sets of repeating patterns of log file records in a log file will now be explained. An underlying presumption in the method is that the log file contains only the repeating patterns of log file records and no other records.

At a first step, the computer 20 analyzes the entire log file, starting from a first line.

At a second step, the computer 20 determines a repeating pattern having a shortest time interval. Because the log file records are repeated on a fixed time interval, the shortest repeating pattern will encompass a first log file record in the log file. The first command is denoted as A1 for example.

At a third step, the computer 20 commences from the first log file record and finds a subsequent log file record in the log file that is "similar" to the first log file record to determine a first time interval, and temporarily presumes that all of the log file records between these two records belong to a set of repeating log file records. It should be noted that the third step can utilize currently available techniques to determine similarity, such as the techniques most word processors use to suggest a different spelling for a misspelled word. The similarity determination method can have a predefined threshold, such as two log file records having at least 95% of the same characteristics in order to be considered similar. The similar subsequent command is denoted as A2 for example.

At a fourth step, the computer 20 commences from the similar log file record A2, to find a subsequent log file record in the log file that is also similar to A1 to determine a second time interval. The similar subsequent record is denoted as A3 for example.

At a fifth step, the computer 20 compares a set of log file records between A1 and A2, and between A2 and A3, and removes any new log file records that are between A2 and A3, but are not between A1 and A2, since the removed log file records correspond to records belonging to a set of repeating log file records (e.g., a pattern) with a longer time interval. Further, the computer 20 removes any log file records that are between A1 and A2, but are not between A2 and A3 since these removed log file records correspond to records belonging to another set of repeating log file records or a pattern with a longer time interval. Thereafter, the set of log file records between A1 and A2, and between A2 and A3 should now be the same, thus comprising a set of repeating log file records having a shortest time interval. This set of repeating log file records having the short time interval is stored in temporary storage and are denoted as pattern A for example.

At a sixth step, from a top of the log file, the computer 20 determines a first log file record that does not appear in the pattern A and denotes this as a start of pattern B1.

At a seventh step, the computer 20 repeats the third through fifth steps using the log file record B as a starting point.

At an eighth step, with the pattern B from the fifth step, the computer 20 removes any log file records in that pattern that belong to pattern A. The computer stores a second set of repeating log file records in the temporary storage and denotes them as pattern B for example.

At a ninth step, the computer 20 repeats the sixth through eighth steps for each successively longer time interval, by finding the log file records that are not in the temporary storage yet. Thus, all of the sets of repeating log file records or patterns are stored with unique identifiers in the temporary storage.

Referring to FIG. 1, in an alternative embodiment, the log file records generated by the computer 20 have user IDs associated with users and a transaction IDs associated with transactions. Further, the graphical user interface 40 is configured to allow a user to specify a user ID or a transaction ID such that the log file 30 would only include log file records associated with the specified user ID or transaction ID. Further, the graphical user interface 40 is further configured to allow a user to view log file records in chronological order or another order based on a predetermined log file record attribute.

The above-described method can be at least partially embodied in the form of one or more computer readable media having computer-executable instructions for practicing the method. The computer-readable media can comprise one or more of the following: floppy diskettes, CD-ROMs, hard drives, flash memory, and other computer-readable media known to those skilled in the art; wherein, when the computer-executable instructions are loaded into and executed by one or more computers or computer servers, the one or more computers or computer servers become an apparatus for practicing the invention.

The system, the method, and the computer readable media for identifying a user-initiated log file record in a log file represent a substantial advantage over other systems and methods. In particular, the system, the method, and the computer readable media provide a technical effect of identifying at least one user-initiated log file record in a log file wherein the log file also has a repeating pattern of log file records automatically generated by a software program.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

The invention claimed is:

1. A method for identifying log file records, the method comprising:
a computer identifying a first plurality of log file records of commands in a log file, each log file record in the first plurality of log file records of commands having been entered into the log file by a software program, the first plurality of log file records of commands being a subset of a second plurality of log file records of commands in the log file, the second plurality of log file records of commands having been entered into the log file between a first time and a second time;
the computer extracting the first plurality of log file records of commands from the second plurality of log file records of commands;
wherein a log file record of commands remaining from the second plurality of log file record of commands as a result of the extracting includes a record that captures a command to perform a user initiated task, wherein the computer extracting includes the computer examining log file records of commands to determine a first repeating pattern of log file records by identifying similar commands executed at a first predetermined time interval and the computer removing log file records of commands that are part of the first repeating pattern of log file records from the second plurality of log file records, wherein the identifying similar commands includes using a threshold indicator of similarity.

2. The method of claim 1, wherein the computer extracting includes the computer examining log file records of commands to determine a first repeating pattern of log file records and to determine a second repeating pattern of log file records and the computer removing log file records of commands that are part of the first repeating pattern of log file records and the second repeating pattern of log file records from the second plurality of log file records, the computer determining the first repeating pattern of log file records by identifying similar commands executed at a first predetermined time interval, the computer determining the second repeating pattern of log file records by identifying similar commands executed at a second predetermined time interval.

3. The method of claim 1, wherein the computer extracting includes performing the extracting in response to a user action and wherein the computer extracting includes the computer examining log file records of commands to determine a first pattern of log file records and the computer removing log file records of commands that are part of the first pattern of log file records from the second plurality of log file records, wherein the computer examining log file records of commands to determine a first pattern of log file records occurs prior to the first time so that at a time of the user action prior to the extracting the computer has determined the first pattern of log file records.

4. The method of claim 1, wherein the log file record of commands remaining from the second plurality of log file records of commands as a result of the extracting comprises a user ID associated with a user and a transaction ID associated with a transaction.

5. The method of claim 1, further comprising:
the computer executing at least one task selected from the group consisting of a user initiated migrate task, a user initiated assign task, and a user initiated submit task between the first time and the second time in response to first graphical user interface action by a user; and
the computer storing a first timestamp value corresponding to the first time and a second timestamp value corresponding to the second time, wherein the computer storing the second timestamp value initiates the computer extracting the first plurality of log file records of commands from the second plurality of log file records of commands, and wherein the computer storing the second timestamp value is performed in response to a second graphical user interface action by a user.

6. A computer readable storage device having computer-executable instructions stored therein, said computer-executable instructions configured to be executed by a computer to implement a method for identifying log file records, the method comprising:
the computer identifying a first plurality of log file records of commands in a log file, each log file record in the first plurality of log file records of commands having been entered into the log file by a software program, the first plurality of log file records of commands being a subset of a second plurality of log file records of commands in the log file, the second plurality of log file records of commands having been entered into the log file between a first time and a second time;
the computer extracting the first plurality of log file records of commands from the second plurality of log file records of commands;
wherein a log file record of commands remaining from the second plurality of log file records as a result of the extracting includes a record that captures a command to perform a user initiated task, wherein the computer extracting includes the computer examining log file records of commands to determine a first repeating pattern of log file records by identifying non user-initiated commands executed at a first predetermined time interval and the computer removing log file records of commands that are part of the first repeating pattern of log file records from the second plurality of log file records.

7. The computer readable storage device of claim 6, wherein the method further comprises the computer displaying the log file record of commands remaining from the second plurality of log file records as a result of the extracting in a graphical user interface that is devoid of the first plurality of log file records.

8. The computer readable storage device of claim 6, wherein the log file record of commands remaining from the second plurality of log file records of the commands as a result of the extracting is a log file record that comprises a record of a first command to perform a first type of user initiated task and a record of a second command to perform a second type of user initiated task, the first type of user initiated task being selected from the group consisting of a user initiated migrate task, a user initiated assign task, and a user initiated submit task, the second type of user initiated task being different from the first type of user initiated task and being selected from the group consisting of a user initiated migrate task, a user initiated assign task, and a user initiated submit task.

9. The computer readable storage device of claim 6, wherein the computer extracting includes the computer examining log file records of commands to determine a first set of log file records by identifying similar commands and the computer removing log file records of commands that are part of the first set of log file records from the second plurality of log file records.

10. The computer readable storage device of claim 6, wherein the computer extracting includes performing the extracting in response to a user action and wherein the computer extracting includes the computer examining log file records of commands to determine a first repeating pattern of log file records and the computer removing log file records of commands that are part of the first repeating pattern of log file records from the second plurality of log file records.

11. The computer readable storage device of claim 6, wherein the computer extracting includes performing the extracting in response to a user action and wherein the computer extracting includes the computer examining log file records of commands to determine a first repeating pattern of log file records and to determine a second repeating pattern of log file records and the computer removing log file records of commands that are part of the first repeating pattern of log file records and the second repeating pattern of log file records from the second plurality of log file records, wherein the computer examining log file records of commands to determine a first repeating pattern of log file records and a second repeating pattern of log file records occurs prior to the first time so that at a time of the user action prior to the extracting the computer has determined the first repeating pattern of log file records and the second repeating pattern of log file records.

12. The computer readable storage device of claim 6, wherein the computer extracting includes performing the extracting in response to a user action and wherein the computer extracting includes the computer examining log file records of commands to determine a first repeating pattern of log file records and to determine a second repeating pattern of log file records and the computer removing log file records of commands that are part of the first repeating pattern of log file records and the second repeating pattern of log file records from the second plurality of log file records, wherein the computer examining log file records of commands to determine a first repeating pattern of log file records and a second repeating pattern of log file records occurs prior to the first time so that at a time of the user action prior to the extracting the computer has determined the first repeating pattern of log file records and the second repeating pattern of log file records, wherein the log file record of commands remaining from the second plurality of log file records of the commands as a result of the extracting is a log file record that comprises a record of a first command to perform a first type of user initiated task and a record of the second command to perform a second type of user initiated task, the first type of user initiated task being selected from the group consisting of a user initiated migrate task, a user initiated assign task, and a user initiated submit task, the second type of user initiated task being different from the first type of user initiated task and being selected from the group consisting of a user initiated migrate task, a user initiated assign task, and a user initiated submit task.

13. The computer readable storage device of claim 6, wherein the log file record of commands remaining from the second plurality of log file records of commands as a result of the extracting comprises a record of a select command, a record of an insert command, and a record of a where command.

14. The computer readable storage device of claim 6, further comprising the computer storing in response to a user action a file comprising the log file record of commands remaining from the second plurality of log file records of commands as a result of the extracting, the file being absent of log file records that are not records of a command to perform a user initiated task.

15. The computer readable storage device of claim 6, wherein the computer extracting includes the computer determining records of the commands that have been generated automatically by the software program.

16. The computer readable storage device of claim 6, wherein a plurality of log file record of commands remaining from the second plurality of log file record of commands as a result of the extracting include a record that captures a command to perform a user initiated task.

17. The computer readable storage device of claim 6, wherein the log file record of commands remaining from the second plurality of log file record of commands consists of a record of a single command.

18. A system comprising a memory device and a computer operably coupled to the memory device, the memory device having a log file stored therein, the computer comprising a computer readable storage device having computer-executable instructions stored therein, said computer-executable instructions configured to be executed by the computer to implement a method for identifying log file records, the method comprising:

the computer identifying a first plurality of log file records of commands in the log file, each log file record in the first plurality of log file records of commands having been entered into the log file by a software program, the first plurality of log file records being a subset of a second plurality of log file records of commands in the log file, the second plurality of log file records of commands having been entered into the log file between a first time and a second time;

the computer extracting the first plurality of log file records from the second plurality of log file records;

wherein the log file record of commands remaining from the second plurality of log file records as a result of the extracting includes a record that captures a command to perform a user initiated task, wherein the computer extracting includes the computer examining log file records of commands to determine a first repeating pattern of log file records by identifying non user-initiated commands executed at a first predetermined time interval and the computer removing log file records of commands that are part of the first repeating pattern of log file records from the second plurality of log file records.

19. The system of claim 18, wherein the computer extracting includes performing the extracting in response to a user action and wherein the computer extracting includes the computer examining log file records of commands to determine a first repeating pattern of log file records and to determine a second repeating pattern of log file records and the computer removing log file records of commands that are part of the first repeating pattern of log file records and the second repeating pattern of log file records from the second plurality of log file records, wherein the computer examining log file records of commands to determine a first repeating pattern of log file records and a second repeating pattern of log file records occurs prior to the first time so that at a time of the user action prior to the extracting the computer has determined the first repeating pattern of log file records and the second repeating pattern of log file records.

* * * * *